United States Patent [19]

Carlin

[11] 4,114,653
[45] Sep. 19, 1978

[54] RUPTURABLE FLOW RETARDING DISK FOR FIRE HOSES

[76] Inventor: Jack M. Carlin, R.F.D. Box 135, Del Mar, Calif. 92014

[21] Appl. No.: 722,709

[22] Filed: Sep. 13, 1976

[51] Int. Cl.² .......................... F15D 1/04; F16K 17/40
[52] U.S. Cl. ........................................... 138/45; 9/317;
137/67; 137/68 R; 138/89; 222/54
[58] Field of Search ................. 137/67, 68 R, 69, 70,
137/71; 222/54; 220/89 A, DIG. 30; 138/44,
45, 89; 9/317; 116/114 AB

[56] References Cited

U.S. PATENT DOCUMENTS

| | | | |
|---|---|---|---|
| 1,954,285 | 4/1934 | Denk et al. | 220/89 A |
| 2,911,988 | 11/1959 | Ravn | 137/67 |
| 3,496,952 | 2/1970 | Amendola | 137/67 |
| 3,906,976 | 9/1975 | Nohr et al. | 137/68 R |

Primary Examiner—Martin P. Schwadron
Assistant Examiner—Richard Gerard
Attorney, Agent, or Firm—Ralph S. Branscomb

[57] ABSTRACT

A rupturable disc shaped capsule replaceably installed in a fire hose coupling, the capsule having a small central bore therethrough to permit the initial limited flow of water, there being one or more regions of the downstream end wall of the capsule which are rupturable by water pressure when the hose fills by virtue of air pockets disposed within the capsule causing the wall to collapse from external pressure there being water-erodible support structure within the capsule which disintegrates upon the rupturing of the capsule wall and entry of water causing the entire capsule assembly to be destroyed and finally blown out the end of the hose.

11 Claims, 7 Drawing Figures

RUPTURABLE FLOW RETARDING DISK FOR FIRE HOSES

BACKGROUND OF THE INVENTION

The present invention relates to a valve for a fire hydrant and hose assembly upon which applicant has filed a patent application having Ser. No. 636,556, and filing date Dec. 1, 1975 and now U.S. Pat. No. 4,022,421. Both inventions are directed toward relieving the situation in which a fireman must jump off the fire truck at a hydrant near the fire and remain there while the truck proceeds to unroll hose and continue to the fire site. Because it is not feasible to continue with the fire truck to the site of the blaze when the high pressure provided by the hydrant is extant in the hose, the man who stays behind must remain there until the firemen on the truck are ready for water, at which point they signal the man at the hydrant who opens the hydrant valve and proceeds to run to the site of the fire to aid his fellows.

The invention of the prior patent application is a sophisticated and elaborate valve operated by a mechanical timer or, in the alternative, remote radio control, and provides for complete control of the fire plug from the site of the fire. This valve is more than satisfactory for use by fire companies in cities of at least a certain size but because the initial cost of procuring the units is high, there is a need for a less sophisticated, but much cheaper, unit which can be purchased by small town companies and volunteer units.

SUMMARY OF THE INVENTION

The present invention fulfills the above-mentioned need for a small delayed release unit and comprises a disposable disc which, together with its housing coupling, is attached to the fire hose and when the hose is attached to the hydrant and the main valve released, the disc will restrict the flow of water in the hose to a small fraction of what it would otherwise be until the hose fills completely, and at this point, back water pressure from the hose ruptures the disc, destroying certain internal supporting structures, and causes the disc to become weakened such that when the nozzle valve of the hose is released, what is left of the capsule is swept away and harmlessly ejected from the hose nozzle.

DETAILED DESCRIPTION OF THE PREFERRED EMBODIMENT

Figure 1:
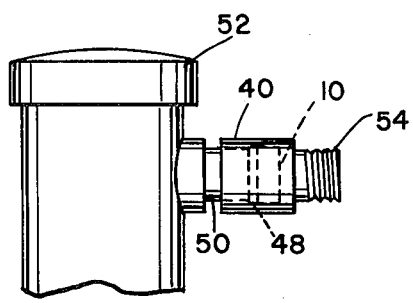
FIG. 1 illustrates a portion of a typical fireplug, with an adapter containing the delay capsule.

The capsule of the present invention is generally indicated by the numeral 10. It is the outgrowth of former models which comprise solid cylinders of erodible material having axial bores therethrough to permit the initially restricted flow of water which would become an increasingly large stream with passage of time. This type of flow-restrictor has been developed for use in oil drilling rigs, but was found to be not particularly suitable for fire fighting applications because the erosion time is the same regardless of the length of the hose.

The capsule 10 does not operate on the principle of progressive erosion. Instead, the capsule permits the slow filling of the hose and will rupture when the hose becomes full due to back water pressure which breaks through the downstream side of the capsule and erodes support structure crucial to the strength of the restraining wall.

In all the embodiments the capsule is shown as having a casing 12 comprising an annular trough and a retainer plate 16, both of these pieces being molded in plastic and snapped together and possibly glued to complete the construction of the unit. The trough-shaped part of the unit comprises an outer cylindrical wall 18 and an inner cylinder 20, which defines a core post for the capsule having a bore therethrough 22, and opposite the snap-on retainer 16, which defines the down-stream wall of the capsule, is the upstream water-restraining wall 24, which is orthogonally related to the inner and outer cylindrical walls in FIGS. 1–3 and 6–7, members 18 and 24 together define the annular trough and as mentioned above could be molded as a single unit although shown separate here for clarity.

Both the upstream and downstream walls are of fairly brittle construction and the upstream wall is not capable of restraining the pressure which exists in a fire hose without support. The requisite support structure is provided in part by cylinders 26 and annular members 28, which are disposed flush against the interior surfaces of the casing in the embodiment illustrated in FIGS. 1–3 and FIGS. 6 and 7. These cylinders and annular members are made of chipboard, cardboard, or other material which will immediately go limp when immersed in water, but is quite strong and rigid in a dry state. The outer cylindrical wall 18 is strong and although it is molded integrally with the upstream wall, the outer wall remains in place after wall 24 breaks away and is ejected. One function of the wall 18 is to retain the seal, described hereafter, in place.

Figure 2:
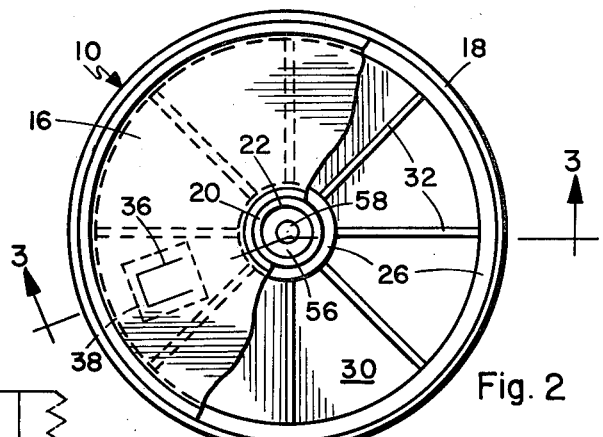
FIG. 2 is an end elevation view of the capsule, with a portion cut away.
Figure 3:
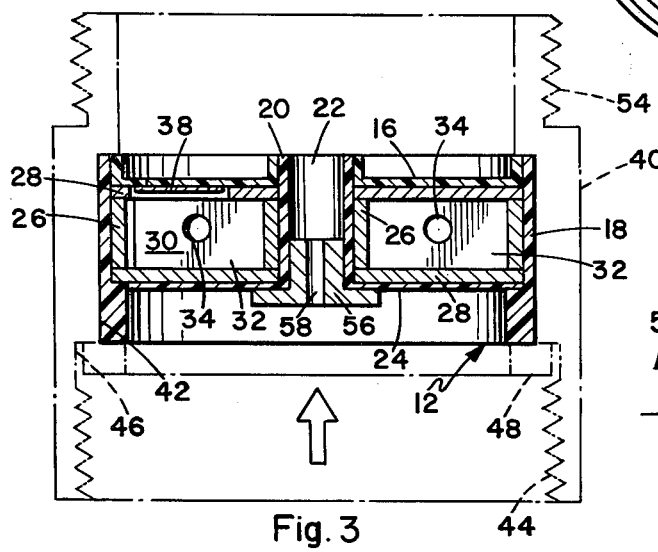
FIG. 3 is a sectional view taken on line 3—3 of FIG. 2, with the adapter indicated in broken line.

Additional support structure is incorporated in the capsule, which has an enclosure 30, at least a portion of which represents an air pocket so that a pressure differential between the external water pressure and air pocket will be expressed as a force across a portion of the capsule wall. In the embodiment of FIGS. 1–3, a number of bracing means 32 are used which may be radial in orientation and deliver support from the downstream wall of the casing to the water-restraining upstream wall. As shown in FIG. 3, it is desirable for these vanes to have holes 34 in them as shown so that once water enters any part of the enclosure it is transmitted through these holes to any remaining sectors to wet all the partitioned veins.

As is seen in FIG. 2, the retainer plate 16 may be scored as at 36 so that a definite weak spot is produced, and also, a piece of tape 38, or the like, may be adhered to the inner surface of the downstream wall or retainer across the scored areas.

The entire capsule as just described is inserted in a coupling 40 which has successively relieved portions 41 and 44, the first of which seats the capsule as shown and the second having a channel 46 defined adjacent to the first relieved portion which seats an O-ring 48. The wall 18 defines another seating surface for the O-ring as shown in FIG. 3. The second relieved portion is threaded to engage nipple 50 of the fire hydrant 52 as shown in FIG. 1, and the opposite end of the coupling is threaded to define a nipple 54 to receive the female portion of a fire hose, not shown.

Another element of the invention, which is optional, is the plug 56 illustrated in FIG. 3 which has a T-shaped cross-section and an orifice 58 through the center to permit the trickle of water at a lower rate than would be allowed by the larger bore 22 in which the plug seats. The plug is made of aerated plaster of paris or other material which is erodible rapidly by the passage of a rapid stream of water, so that the plug does not remain in the larger bore for long.

In operation, the coupling, as shown in FIG. 3, is fitted with the capsule 10 and the O-ring 48 and a length of fire hose is engaged onto the nipple 54. The coupling is then engaged on the nipple of a fire hydrant near the scene of the fire and the main hydrant valve is opened, subsequent to which the fire truck proceeds, with all the firemen aboard, to the site of the fire, unreeling the hose as it goes.

Meanwhile, an immediate trickle of water is experienced through the plug 56, rapidly eroding the walls of the orifice 58 until the plug is completely destroyed. During this time, the hose will be completely limp and easy to handle by the fireman.

Upon the disappearance of the plug, water will proceed at a more rapid rate through the larger bore 22 and will continue at this rate until the entire hose is filled, regardless of the overall length of the hose. When the entire hose is full of water, it will become rigid and is no longer easy to work with and entrain through the passageways of a burning building. At this point, a surge and back pressure will be experienced by the retainer 16, which defines the downstream wall of the capsule. The weakened portion 36 of this member will break through the tape 38 and admit a rush of water into the enclosure 30 which will quickly weaken all of the support structure within the enclosure, including the vanes, cardboard cylinders 26, and rings 28, so that nothing remains to support the water-restraining wall.

It should be noted at this point that the nozzle at the operative end of fire hose has not yet been opened so that inasmuch as the hose is completely full, there will be no water flow regardless of the condition of the capsule. However, immediately upon the opening of the nozzle and the dropping of the pressure in the hose, the capsule, which has been weakened beyond its ability to restrain the water flow by the erosion of the support structure, will be destroyed and broken into small pieces by the high pressure of the water as it rushes through the hose. The destroyed remnants of the capsule will be harmlessly ejected through the hose nozzle.

Figure 4:
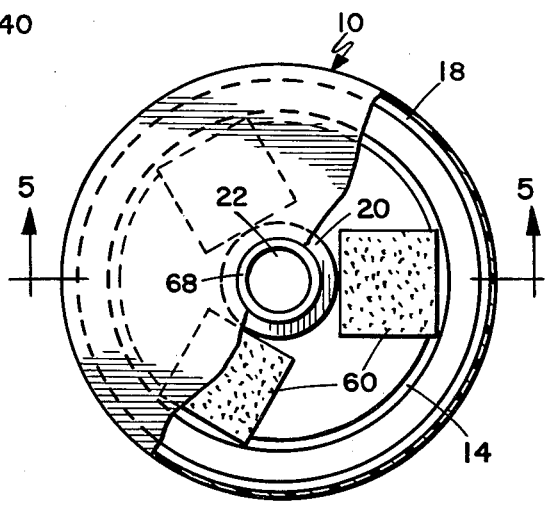
FIG. 4 is an end elevation view, partially cut away, of an alternative capsule.
Figure 5:
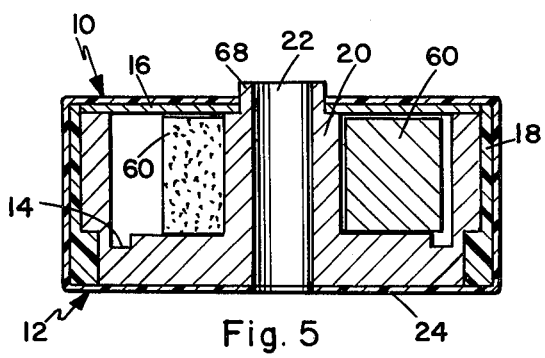
FIG. 5 is a sectional view taken on line 5—5 of FIG. 4.

Two further modifications of the capsule operate on the same principles as the first, the first of these being illustrated in FIGS. 4 and 5. In this embodiment, the casing 12 comprises a thin plastic envelope which enclose a cylindrical reinforcing wall 18 which seats an annular trough-defining member 14 comprised of aerated plaster of paris or like erodible structure rather than cardboard. This trough-defining structure together with the downstream wall 16 could constitute the sole reinforcing support for the upstream wall 24 of the capsule, or cardboard vanes as previously indicated could be used for support. However, an alternative structure is shown wherein radial blocks 60 of water soluble material provide additional support. One suitable substance has been found to be household sugar cubes which are amazingly strong when dry and yet crumble immediately upon the absorption of even a drop of water.

Figure 6:
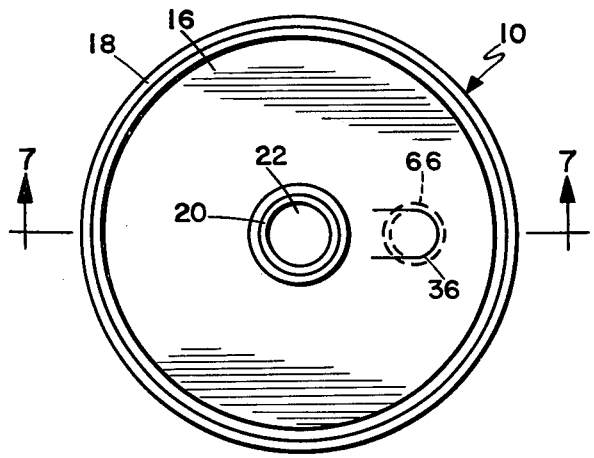
FIG. 6 is an end elevation view of a further capsule.
Figure 7:
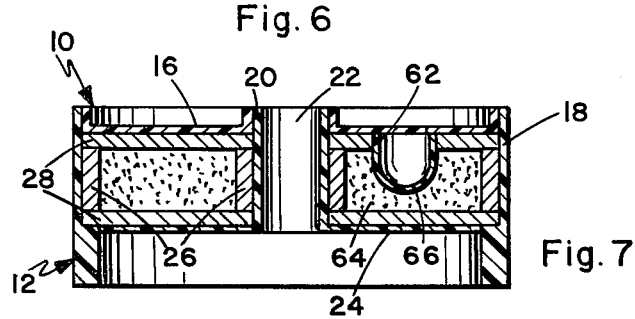
FIG. 7 is a sectional view taken on line 7—7 of FIG. 6.

The second modification, illustrated in FIGS. 6 and 7, utilizes the interior cardboard structure 26 and 28, but rather than having the additional vane supports, an opening is provided at 62 in one of the annular cardboard members and through this opening, prior to the installation of retainer 16, a soluble substance 64 is packed into the enclosure. Large grain salt has been found suitable for this purpose and will pack nicely to form an effectively solid mass. A somewhat dome-shaped hard gelatin bubble 66 is then pressed through the opening 62 to further compress the soluble material 64, and the retainer is then snapped into place with the scored or weakened portion 36 over the air pocket defined by the bubble 66. It is obvious how the retainer 16 will break under pressure at the scored area, and the water thus admitted into the bubble will dissolve same and then dissolve the enclosed salt or other substance and weaken the cardboard structure, causing the eventual collapse of the restraining wall.

Clearly, it would involve only a modest variation of this last embodiment to utilize a pressed or molded annulus of salt or other soluble material with an air-pocket molded into the structure if need be where the bubble 66 is shown.

As another variation, a molded block of soluble substance could be supplementally reinforced with either cardboard or the like or other easily dissolvable material such as the sugar cubes of FIG. 4.

In all the embodiments, the core post 18 is shown as having a slight extension 68 in the downstream direction. The purpose of the extension is to direct the water stream as it flows through the bore 20 away from the capsule. This highly pressurized stream will keep water in the hose away from the capsule, even though the hose may be extended uphill, until the hose is full or nearly full.

All three of the embodiments thus illustrated and described function on a similar principle, namely the provision of a capsule having an air pocket inside and a rupturable downstream end wall permitting water from the hose side to enter into an enclosure and dissolve support structure, resulting in the complete destruction of the capsule.

Because the capsules are destroyed, they are, of course, disposable and replaceable, and subsequent to each fire, the coupling 38 would ordinarily be fitted with a new capsule and made ready for the next run. The capsules are cheap enough in construction that they could be purchased in bulk by small fire departments and volunteers who are not well endowed financially at considerable savings because of the the elimination and need for the fireman.

I claim:

1. A delayed release device for installation in a liquid passageway temporarily restricting liquid flow therein comprising:
   (a) a substantially impervious capsule having a casing which defines an enclosure;
   (b) said capsule having at least one liquid-restraining wall and including support structure disposed in said enclosure to reinforce said restraining wall against collapse by external fluid pressure;

(c) said support structure being liquid-permeable and subject to rapid and drastic weakening when immersed in a liquid;

(d) at least a portion of the casing of said capsule being rupturable upon the occurence of a predetermined level of external fluid pressure to admit liquid into said enclosure, whereupon said support structure is weakened and said restraining wall is subject to collapse to release liquid in said passageway.

2. Structure according to claim 1 wherein said capsule is disc-shaped and said casing includes said restraining wall, a cylindrical side wall orthogonal to said restraining wall, and a downstream end wall parallel to said restraining wall.

3. Structure according to claim 2 wherein said support structure comprises a soluble substance occupying at least a portion of said enclosure and braced against said liquid restraining wall to support same.

4. Structure according to claim 3 wherein said soluble substance is particulate and is packed in said enclosure to define an effectively solid mass.

5. Structure according to claim 4 and including a soluble solid hollow bubble displacing inwardly from said casing and disposed around the rupturable portion of said casing to define an air pocket in said mass adjacent said rupturable casing portion.

6. Structure according to claim 2 and including a bore in said disc defined by a hollow core post orthogonally extended between said end walls to permit limited liquid flow through said capsule when same is disposed in a liquid passageway.

7. Structure according to claim 6 wherein said support structure comprises a plurality of radial members extended between said core, said end wall, and said liquid restraining wall.

8. Structure according to claim 7 wherein said radial members each comprises a water soluble block.

9. Structure according to claim 7 wherein said radial members comprise rigid vanes susceptible to rapid deterioration when submerged in liquid.

10. Structure according to claim 6 and including an erodible plug inserted in said bore, said plug having an orifice therethrough of diameter smaller than said bore to permit an initial trickle of liquid when said capsule is used.

11. Structure according to claim 6 wherein said core post extends through said downstream end wall and beyond said casing to act as a nozzle delaying the wetting of the downstream end of said casing.

* * * * *